(12) United States Patent
Blunk

(10) Patent No.: US 8,771,900 B2
(45) Date of Patent: Jul. 8, 2014

(54) SUPER-HYDROPHOBIC COMPOSITE BIPOLAR PLATE INCLUDING A POROUS SURFACE LAYER

(75) Inventor: Richard H. Blunk, Macomb Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 828 days.

(21) Appl. No.: 12/841,813

(22) Filed: Jul. 22, 2010

(65) Prior Publication Data
US 2012/0021336 A1    Jan. 26, 2012

Related U.S. Application Data

(62) Division of application No. 11/590,284, filed on Oct. 31, 2006, now Pat. No. 7,803,499.

(51) Int. Cl.
*H01M 4/64* (2006.01)
*H01M 4/66* (2006.01)

(52) U.S. Cl.
USPC .................... 429/520; 429/518; 429/519

(58) Field of Classification Search
USPC ............................................. 429/535
See application file for complete search history.

(56) References Cited

U.S. PATENT DOCUMENTS

| | | | |
|---|---|---|---|
| 4,943,496 A | 7/1990 | Okada et al. | |
| 5,618,392 A * | 4/1997 | Furuya | 204/252 |
| 5,998,058 A | 12/1999 | Fredley | |
| 2003/0054221 A1* | 3/2003 | Saito et al. | 429/34 |
| 2003/0157391 A1* | 8/2003 | Coleman et al. | 429/34 |
| 2006/0093735 A1 | 5/2006 | Cheng et al. | |
| 2008/0102347 A1* | 5/2008 | Blunk | 429/38 |

FOREIGN PATENT DOCUMENTS

WO    WO 03/047016 A2    6/2003
WO    WO 2005/117176 A2    12/2005

* cited by examiner

*Primary Examiner* — Barbara Gilliam
*Assistant Examiner* — Steven Scully
(74) *Attorney, Agent, or Firm* — John A. Miller; Miller IP Group, PLC

(57) ABSTRACT

A hydrophobic composite bipolar plate for a fuel cell including a substrate having a composite material including carbon and a surface layer on the substrate. The surface layer includes silicon and oxygen, and a hydrocarbon moiety attached to at least one of the silicon or oxygen.

18 Claims, 3 Drawing Sheets

SUPER-HYDROPHOBIC COMPOSITE BIPOLAR PLATE INCLUDING A POROUS SURFACE LAYER

CROSS-REFERENCE TO RELATED APPLICATIONS

This application is a divisional application of U.S. patent application Ser. No. 11/590,284, filed Oct. 31, 2006 and titled Super-Hydrophobic Composite Bipolar Plate.

BACKGROUND OF THE INVENTION

1. Field of the Invention

This invention relates generally to a bipolar plate for a fuel cell and, more particularly, a bipolar plate for a fuel cell that includes a super-hydrophobic coating.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs, this sets an approximate upper limit on the contact angle needed to realize the beneficial effects of hydrophilic plate surfaces on channel water transport and low load stability.

Hydrophilic treatments of bipolar plates may be suitable for inducing capillary flows in fine-pitched flow fields. However, it may be desirable to provide hydrophobic surfaces for other bipolar plate designs, for example, in flow field designs with wider channels and/or if external contamination is found to contaminate hydrophilic surfaces because the hydrophobic surfaces are less prone to contamination than are hydrophilic surfaces. In addition, a hydrophobic bipolar plate is desired from an electrochemical and chemical durability standpoint. Water and water-containing hydrogen ions and fluoride ions, i.e., hydrofluoric acid observed from degradation of the perfluorosulfonic acid membrane materials, will have a high contact angle and not wet out the hydrophobic plate surface, thereby reducing the rate of chemical and electro-chemical degradation of composite and stainless steel plates, respectively. More importantly, because of the high contact angle exhibited by water droplets on hydrophobic surfaces, lower reactant gas velocities are required to force the droplets out of the channels, thereby enabling the gases to effectively react in the electrodes. Lower gas velocities result in a reduction of compressor parasitic losses and in an increase in hydrogen gas utilization.

SUMMARY OF THE INVENTION

One embodiment of the invention includes a product including a fuel cell component having a porous layer comprising silicon, oxygen and carbon, where the porous layer is super-hydrophobic having a contact angle of greater than 130°.

Another embodiment of the invention includes a fuel cell bipolar plate including a composite substrate comprising carbon, and a porous layer comprising silicon, oxygen and carbon, where the porous layer is super-hydrophobic having a contact angle greater than 130°.

Another embodiment of the invention includes a bipolar plate comprising a substrate, a first layer over the substrate comprising carbon, a porous layer over the first layer, where the porous layer comprises silicon, oxygen and carbon, and where the porous layer has a contact angle greater than 130°.

Another embodiment of the invention includes a method for making a super-hydrophobic bipolar plate including providing a substrate including carbon, and a porous layer over the substrate, where the porous layer includes silicon and oxygen. The method includes causing the carbon in the substrate to diffuse outwardly through the porous layer and attaching to at least one of the silicon or oxygen.

Another embodiment of the invention includes a method for making a super-hydrophobic composite bipolar plate including providing a substrate comprising a composite material including carbon, and a porous layer on the substrate, where the porous layer includes silicon and oxygen. The method includes heating the substrate and surface layer to cause moieties including carbon from the substrate to diffuse outwardly through the porous layer and so that the moiety is attached to one of the silicon or oxygen.

Other embodiments of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following discussion of the embodiments of the invention directed to a bipolar plate for a fuel cell having a hydrophobic coating is merely exemplary in nature and is in no way intended to limit the invention or its application or uses.

Figure 1:
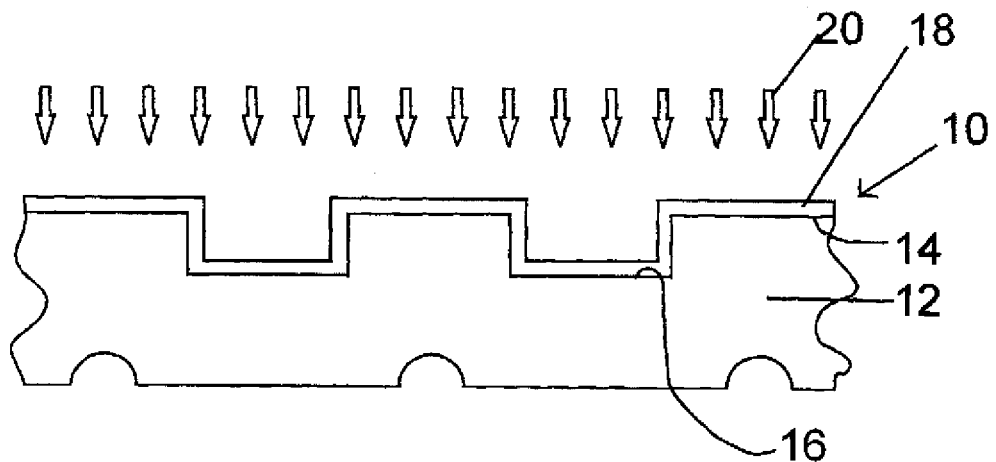
FIG. 1 illustrates one embodiment of the invention that includes making a super-hydrophobic fuel cell component including heating a substrate including carbon to diffuse the carbon into an overlying porous layer that includes silicon and oxygen so that the carbon attaches to at least one of the silicon and oxygen.

FIG. 1 illustrates a method for making a fuel cell component 10 including a substrate 12 which may, for example, be a composite bipolar plate including a carbon containing material such as graphite, according to an embodiment of the present invention. The substrate 12 may include a plurality of lands 14 and channels 16 to form a gas flow field useful in a fuel cell. A porous surface layer 18 is deposited over the lands 14 and channels 16 of the substrate 12. The surface layer 18 may be deposited by any suitable process, such as chemical vapor deposition (CVD), physical vapor deposition (PVD), dipping, spraying, etc. In one embodiment of the invention, the porous surface layer 18 may include silicon and oxygen, such as for example, silicon dioxide, siloxane, a siloxane derived material or a material including $SiO_x$, where $0.1 < x < 2.0$. In one embodiment of the invention, carbon material, such as hydrocarbon moieties from the substrate 12, is diffused through the porous surface layer 18 and attached to at least one of the silicon and oxygen. In one embodiment, the substrate 12 is heated to a temperature ranging from 90° C. to 200° C. for 10 to 90 minutes by heat radiation on 20 to cause the hydrocarbon moieties to diffuse outwardly from the substrate 12 and into and through the porous surface layer 18. The hydrocarbon moieties attached to one of the silicon and/or oxygen creates a super-hydrophobic surface having a contact angle greater than 130°.

The heat radiation 20 can be any heat radiation suitable for the purposes described herein. Suitable examples include electron beam or laser beam heating. Laser beam heating may present certain concerns because of the localized heating required in that the composite plate materials typically have a high thermal conductivity, and thus, temperature gradings could be produced. When using a laser beam for the heat radiation 20, it may be desirable to only heat the channels, and not the lands, of the plates so that the channels can become hydrophobic and thereby facilitate channel water removal.

Hydrocarbons and composite plates include non-reactant monomers and oligomers, such as styrene, vinyl esther, phenols, esthers, epoxy, amines, etc., internal low-molecular weight processing additives and internal mold release agents. Hydrocarbons in the carbon coating on metal plates also includes these non-reactant monomers and oligomers as well as residual solvents used in the coating application.

Figure 2:
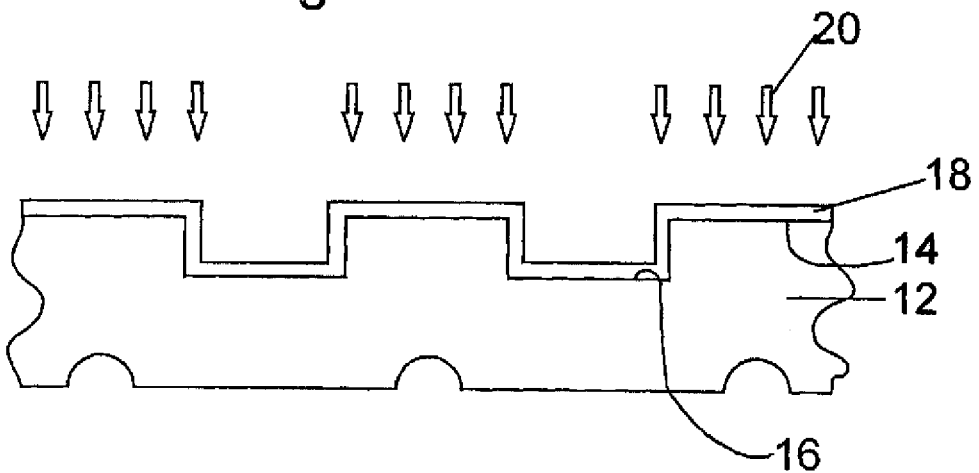
FIG. 2 illustrates another embodiment of the invention that includes making a super-hydrophobic fuel cell component including selectively heating portions of a substrate including carbon so that carbon diffuses through an overlying porous layer including silicon and oxygen and so that the carbon attaches to at least one of the silicon or oxygen in selective regions of the porous layer.
Figure 5:
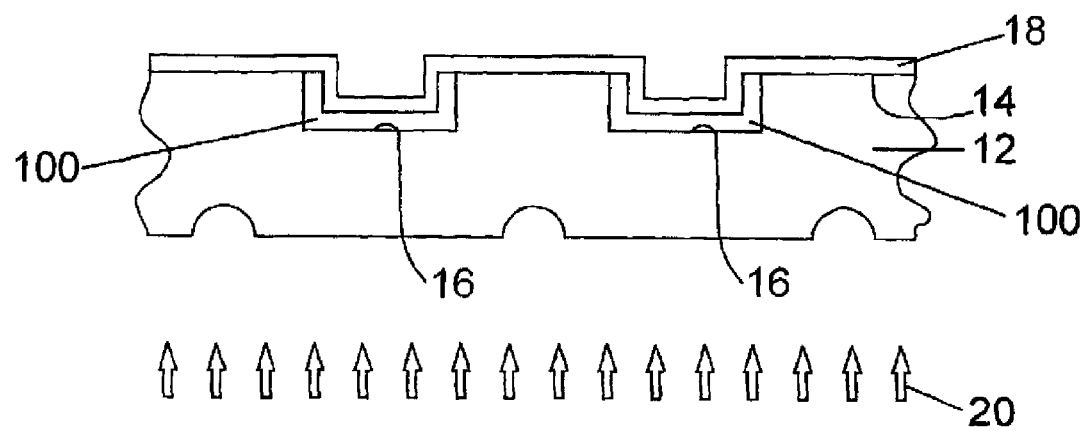
FIG. 5 illustrates another embodiment of the invention that includes making a super-hydrophobic fuel cell component including a first substrate having an upper surface and depositing a diffusion barrier material over selected portions of the upper surface of the substrate leaving portions of the upper surface exposed, where the substrate comprises a hydrocarbon material, and depositing a porous layer comprising silicon and oxygen over the diffusion barrier material and the exposed portions of the upper surface of the substrate and heating the substrate so that hydrocarbon moieties diffuse from the substrate into the porous layer in portions of the porous layer that overlie the exposed portions of the upper surface of the substrate.

Referring now to FIG. 2, in another embodiment of the invention, the heat radiation 20 is applied to selective areas of the substrate 12, such as only over the lands 14 so that hydrocarbon moieties are diffused through the porous layer only in the areas near the lands 14. Alternatively, as shown in FIG. 5, a diffusion barrier material 100 may be selectively deposited over the substrate 12, for example in the area of the channel 16, so that hydrocarbon moieties are prevented from diffusing into the porous layer 18 in the area where the diffusion barrier material 100 is provided. The diffusion barrier material 100 may be selectively deposited using masking techniques or by selectively removing portions of a diffusion barrier material 100 deposited over the upper surface of the substrate 12, for example, by removing portions of the diffusion barrier material 100 deposited over the lands 14. Consequently, super-hydrophobic surfaces are selectively formed on the porous layer 18, for example, only over the lands 14.

Figure 3:
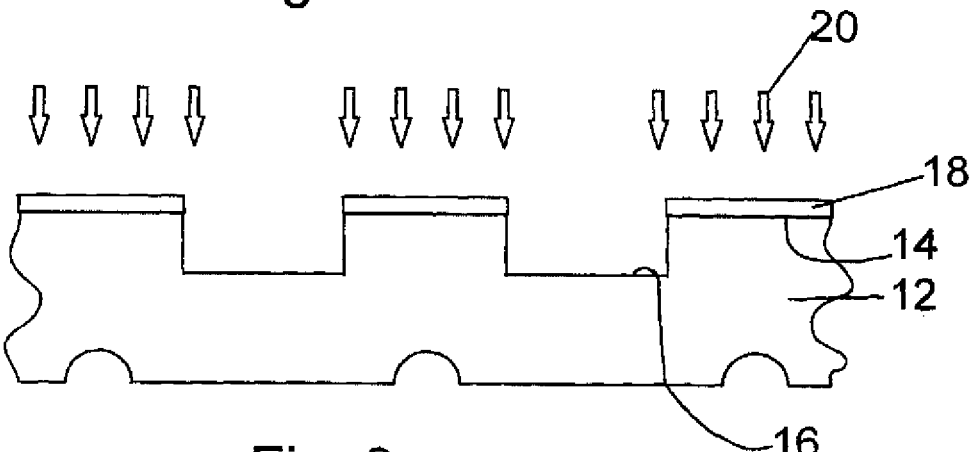
FIG. 3 illustrates another embodiment of the invention that includes making a super-hydrophobic fuel cell component including providing a substrate including carbon and a porous layer selectively deposited over portions of the substrate and selectively heating portions of the substrate so that carbon diffuses into the porous layer and attaches to at least one of the silicon or oxygen.

Referring now to FIG. 3, in another embodiment, the porous layer 18 may be selectively deposited, for example, only over the lands 14 and heat applied directed only to the area of the lands 14 of the substrate.

Figure 4:
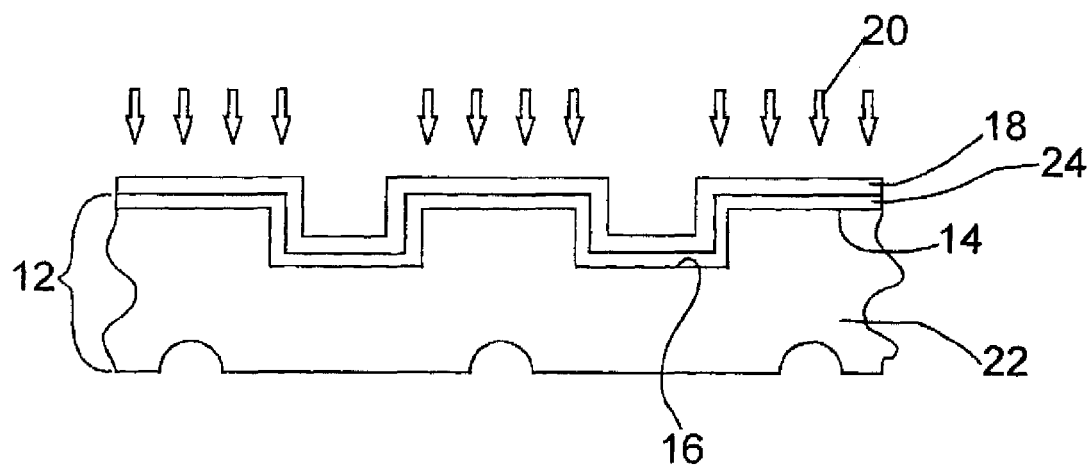
FIG. 4 illustrates another embodiment of the invention that includes making a super-hydrophobic fuel cell component including providing a first substrate and a first layer including carbon over the first substrate and a porous layer including silicon and oxygen over the first layer, and heating the first substrate, first layer and porous layer so that carbon from the first layer diffuses into the porous layer and attaches to at least one of the silicon or oxygen therein.

FIG. 4 illustrates another embodiment of the invention where the substrate 12 includes a base material 22 such as a metal, for example, stainless steel, and a first layer 24 overlying the base material 22. The first layer 24 includes a carbon material, such as graphite. In one embodiment, the first layer 24 consists of carbon black and/or graphite particles mixed with an organic resin, such as polymide imide, phenolic, epoxy, etc. A porous layer 18 is provided over the first layer 24 and hydrocarbon moieties are diffused through the porous layer 18, for example, by applying heat to the substrate 12 so that the hydrocarbon moiety is attached to at least one of silicon and/or oxygen in the porous layer 18 to create super-hydrophobic surfaces having a contact angle greater than 130°. The diffusion of hydrocarbon moieties from the substrate 12 into the porous layer 18 may be accomplished, for example, by heating the substrate 12 in an oven, or on a hot plate, with a laser beam or electron beam, or by hot pressing portions of the porous layer 18.

Table I presents contact angle results as a function of 175° C. oven exposure time for various composite plate materials coated with PlasmaTech Inc. $SiO_x$ coating (~80 nm thick) via a plasma enhanced chemical vapor deposition process. The samples were wrapped in aluminum foil in the oven to eliminate external contamination effects. Contact angle measurements were made at 21° C. using the Kruss DSA 10 Mk2 drop analyzer and a 10 µl DI-water drop volume. Except for material D, the carbon coating typically consists of carbon black and/or graphite particles, mixed with an organic resin, such as polymide imide, phenolic, epoxy, etc. The contact angles for all of the composite materials increased to super-hydrophobic levels within 30 minutes. Note that the uncoated VE and NBO B samples did not increase in phobicity with 175 C oven exposures, indicating that a silica philic layer is required.

TABLE I

| time (hr) | VE (no SiOx) | VE | NBO B (no SiOx) | NBO B | S | D | NBO C2 |
|---|---|---|---|---|---|---|---|
| 0 | 76.13 | <10 | 81.22 | <10 | <10 | <10 | <10 |
| 0.5 | 75.26 | 68.4 | 80.22 | 139.21 | 154.89 | ~13 | 139 |
| 1 | 76.96 | 121.5 | 79.85 | 139.11 | 139 | 43.9 | 146.8 |
| 54 | 74 | 135.67 | 81.25 | 150.98 | 130.77 | 10-60 non-uniform | 153.69 |

Figure 6:
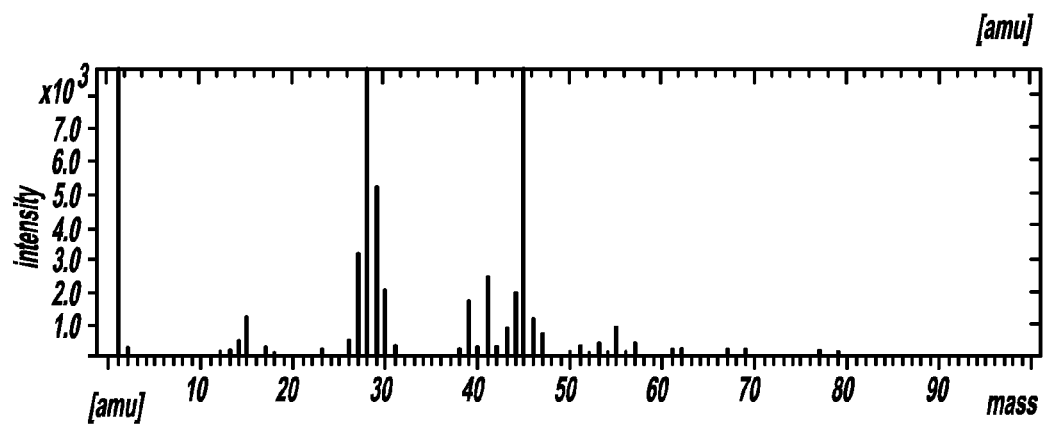
FIG. 6 is a graphic illustration of a SIMS analysis of the surface composition of a composite bipolar plate having a siloxane coating thereon that has not been heated.
Figure 7:
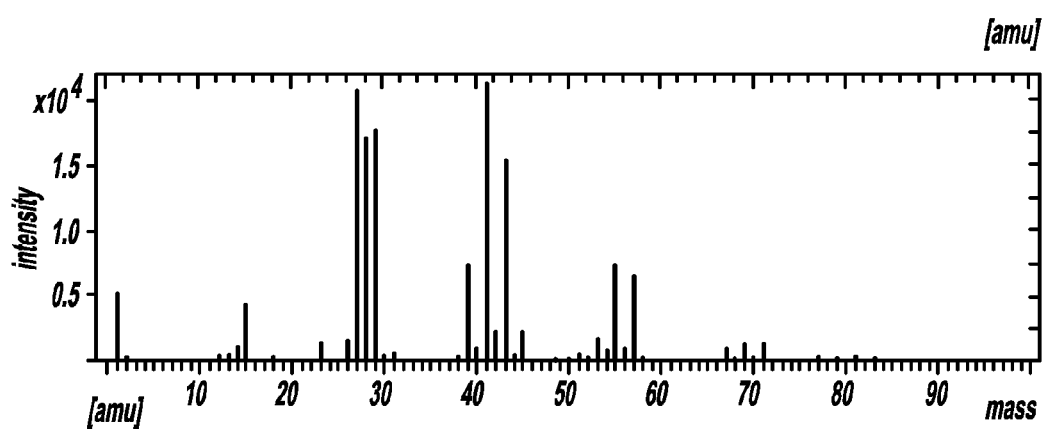
FIG. 7 is a graphic illustration of a SIMS analysis of the surface composition of a composite bipolar plate having a siloxane coating thereon that has been heated.

FIG. 6 is a graphic illustration of a SIMS analysis of the surface composition of a composite bipolar plate having a silica coating thereon that has not been heated. FIG. 7 is a graphic illustration of a SIMS analysis of the surface composition of a composite bipolar plate having a silica coating thereon that has not been heated. After heating, the porous layer 18 includes hydrocarbon moieties attached to at least one of the silicon or oxygen therein (atomic mass units of 27, 41 and 43). Fragments identified in the SIMS analysis were as follows:

For the unheated sample: (XX-Y: XX=atomic mass unit, Y=element)
28-Si
45-SiOH
29-SiH,C2H5
41-C3H5
44-SiO.
For the heated sample: (XX-Y: XX=atomic mass unit, Y=element)
41-C3H5
27-C2H3

43-C3H7
29-SiH,C2H5
28-Si

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A product comprising a fuel cell component, said product comprising:
a substrate including a hydrocarbon material, a porous surface layer over the substrate, the porous surface layer including silicon and oxygen, a diffusion barrier selectively deposited between the porous layer and the substrate, and a hydrocarbon moiety attached to at least one of the silicon or oxygen, wherein at least a portion of the porous surface layer is hydrophobic, and wherein the diffusion barrier prevents the hydrocarbon moiety from diffusing into the porous layer where the diffusion barrier is provided.

2. The product as set forth in claim 1 wherein the substrate includes a composite material comprising said hydrocarbon material.

3. The product as set forth in claim 1 wherein the substrate includes a base and a first layer over the base, and wherein the first layer includes said hydrocarbon material.

4. The product as set forth in claim 3 wherein the base includes a metal.

5. The product as set forth in claim 4 wherein the base includes stainless steel.

6. The product as set forth in claim 3 wherein the first layer includes carbon black and/or graphite particles mixed with an organic resin.

7. The product as set forth in claim 1 wherein the substrate includes a gas flow field formed therein including a plurality of lands and channels.

8. The product as set forth in claim 7 wherein the porous surface layer is over only the lands and not over the channels.

9. The product as set forth in claim 1 wherein the porous surface layer is super-hydrophobic having a contact angle greater than 130°.

10. The product as set forth in claim 1 wherein the porous surface layer includes silicon dioxide.

11. The product as set forth in claim 1 wherein the porous surface layer includes $SiO_x$ where $0.1<x<2.0$.

12. The product as set forth in claim 1 wherein the porous surface layer includes silicon bonded to oxygen.

13. A composite bipolar plate for a fuel cell, said bipolar plate comprising a substrate including a hydrocarbon material and a porous surface layer over the substrate, said porous surface layer including $SiO_x$ where $0.1<x<2.0$, said substrate including a base and a first layer over the base where the first layer includes the hydrocarbon material, said base being a metal.

14. The bipolar plate as set forth in claim 13 wherein the base includes stainless steel.

15. The bipolar plate as set forth in claim 13 wherein the first layer includes carbon black and/or graphite particles mixed with an organic resin.

16. The bipolar plate as set forth in claim 13 wherein the substrate includes a gas flow field formed therein including a plurality of lands and channels.

17. The bipolar plate as set forth in claim 16 wherein the porous surface layer is over only the lands and not over the channels.

18. The bipolar plate as set forth in claim 13 wherein the porous surface layer is super-hydrophobic having a contact angle greater than 130°.

* * * * *